Dec. 2, 1969          Z. L. WILLIAMS          3,481,478
OIL FILTER WITH PAPER FILTERING ELEMENT
Filed Jan. 30, 1967
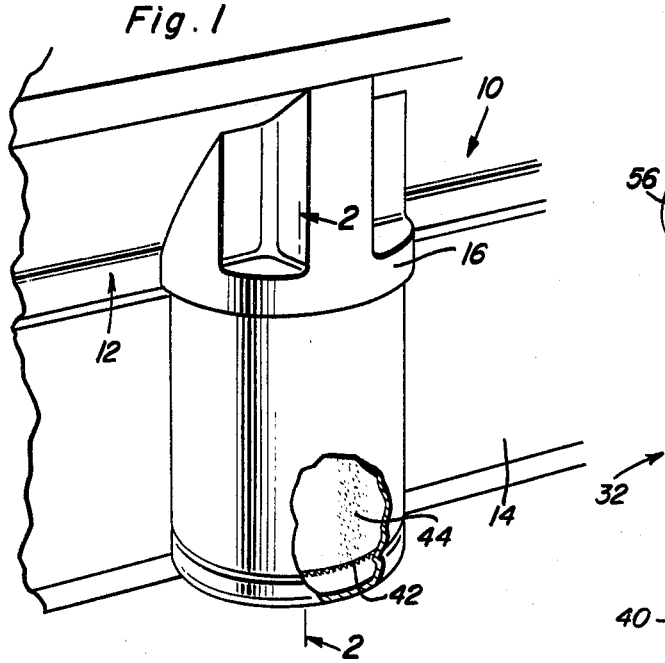
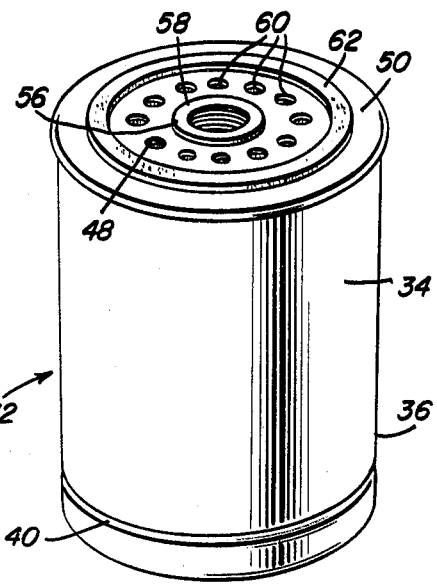
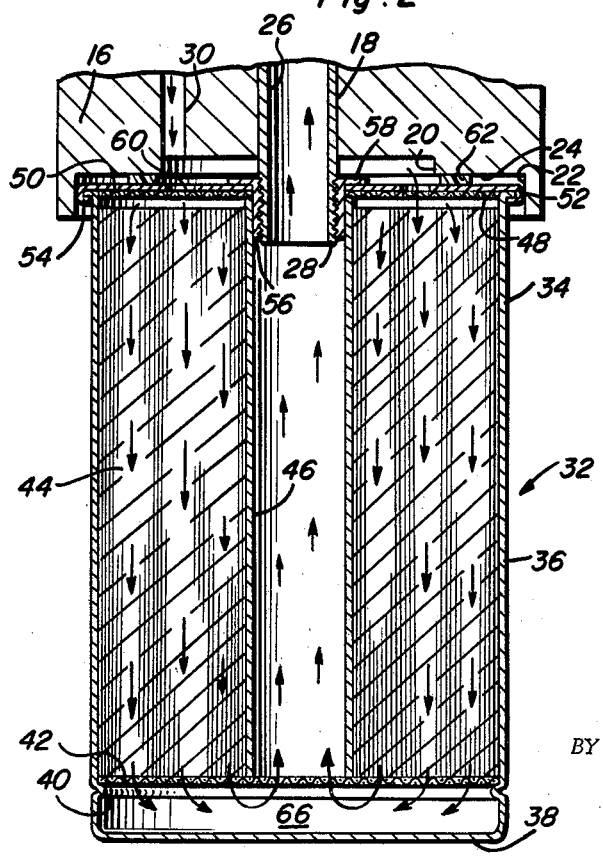
INVENTOR.
ZELMER LEE WILLIAMS

United States Patent Office 3,481,478
Patented Dec. 2, 1969

3,481,478
OIL FILTER WITH PAPER FILTERING ELEMENT
Zelmer Lee Williams, Tillamook, Oreg., assignor of fifty percent to Calvin Whited, Roy, Wash.
Filed Jan. 30, 1967, Ser. No. 612,419
Int. Cl. B01d 27/04
U.S. Cl. 210—439                                 2 Claims

ABSTRACT OF THE DISCLOSURE

A disposable lubricating oil filter including a rolled paper oil filtering body having a rigid tubular core extending therethrough hand mounted lengthwise in a generally cylindrical housing including one end wall with the end of the oil filtering body adjacent the end wall spaced therefrom and the remote end of the tubular core internally threaded for threaded engagement on an extended end portion of an oil return line and the adjacent end of the housing provided with an annular perforated end wall from which the adjacent end of the tubular core is supported and adapted for sealed engagement with a large diameter sealing washer extending about the outlet end of the tubular core and spaced radially outwardly of the latter.

---

The main object of this invention is to provide a readily replaceable throw-away type of oil filter for vehicle engines.

Another object of this invention is to provide an oil filter cartridge including novel structural features enabling it to utilize a roll of paper as an oil filtering body.

Still another object of this invention is to provide an oil filter that may be readily modified so as to form its own outer casing or be constructed in a manner to be removably positioned within an oil filter housing.

A final object of this invention to be specifically enumerated herein is to provide an oil filter in accordance with the preceding objects which will conform to conventional forms of manufacture, be of simple construction and easy to replace so as to provide a device that will be economically feasible, long lasting and relatively trouble-free to renew.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of an engine block illustrating the manner in which the oil filter of the instant invention is to be supported therefrom;

FIGURE 2 is an enlarged fragmentary vertical sectional view taken substantially upon the plane indicated by the section line 2—2 of FIGURE 1; and FIGURE 3 is a perspective view of the oil filter.

Referring now more specifically to the drawings the numeral 10 generally designates a conventional form of internal combustion engine such as that utilized in present-day passenger vehicles and/or trucks.

The internal combustion engine 10 includes a block portion referred to in general by the reference numeral 12 from which an oil pan 14 is dependingly supported in the usual manner. The block 12 includes an oil filter mounting boss 16 which may either be formed as an integral portion of the block 12 or removably attached thereto in any suitable manner (not shown).

The boss 16 has a passage 18 formed vertically therethrough and the lower end of the boss 16 includes first and second counterbores 20 and 22 defining an annular shoulder 24 between the counterbores 20 and 22. An oil inlet pipe or return pipe 26 extends through the passage or bore 18 and includes a lower externally threaded end portion 28 which projects below the lower end of the boss 16. Further, the boss 16 also includes a second passage or bore 30 defining an oil outlet passage and the outlet end of the bore or passage 30 opens into the first counterbore 20.

The preceding description of the boss 16 is to be considered as conventional structure with which at least one form of the oil filter of the instant invention is adapted to be used. The oil filter of the instant invention is generally referred to by the reference numeral 32 and includes an elongated generally cylindrical housing 34 including cylindrical side wall portions 36 and an integral wall 38 closing the lower end of the housing 34.

The cylindrical side wall portions 36 are crimped as at 40 so as to define an inwardly projecting rib or shoulder spaced above the end wall 38 and a circular mesh panel 42 is disposed within the housing 34 and rests upon the rib or shoulder 40.

A cylinder 44 of filtering material comprising a roll of oil filtering paper is snugly lengthwise received within the housing 34 and includes a rigid center tubular core member 46 whose lower end terminates at the lower end of the cylinder 44 and is secured to the mesh panel 42 in any convenient manner. The upper end of the core member 46 projects above the upper end of the cylinder 44 and an annular mesh panel 48 has its outer peripheral portions supported from the upper end of the cylindrical wall portions 36 and its inner peripheral portions supported from the upper end of the core member 46. Further, the filter 32 includes an annular top wall 50 which conforms generally to the size and shape of the annular mesh panel 48 and overlies the latter at its inner peripheral portions. However, the outer peripheral portions of the annular top wall 50 are crimped down, over and under an outwardly directed circumferentially extending flange 52 carried by the upper ends of the cylindrical wall portions 36 as at 54. Further, a tubular fitting 56 including a radially outwardly projecting and circumferentially extending flange 58 on its upper end and which is internally threaded is secured within the upper end of the core member 46 with the flange 58 captively retaining the inner peripheral portions of the annular mesh panel 48 and top wall 50 between the upper end of the core member 46 and the undersurface portions of the flange 58.

The top wall 50 is provided with a plurality of circumferentially spaced oil inlet openings 60 through which oil from the first counterbore 20 may pass into the upper end of the housing 34 between the side wall portions 36 and the core member 46 and an annular resilient washer 62 is disposed between the shoulder 24 and the upper surface of the top wall 50 outwardly of the oil inlet openings 60. The fitting 56 is threaded onto the externally threaded lower end portion 28 of the return pipe 26 in a manner such that the resilient washer 62 is compressed between the top wall 50 and the shoulder 24 thereby forming a fluid-tight seal between the confines of the first counterbore 20 and the top wall 50 outwardly of the oil inlet openings 60. In operation, the oil filter 32 may be readily threaded into positions such as that illustrated in FIGURES 1 and 2 of the drawings. Then, as oil passes downwardly through the passage or bore 30 from the oil pump of the engine 10 and into the first counterbore 20, the oil to be cleansed will pass through the oil inlet openings 60 down through the cylinder 44 in a manner so as to be filtered by the latter and then into the area 66 between the mesh panel 42 and the end wall 38 before passing upwardly through the center of the mesh panel 42 and into the interior of the core member 46 before passing outwardly of the oil filter 32 through the return pipe 26. Of course, the oil filter 32 is to be constructed such that it will be capable of being produced at a low cost and therefore usable as a throwaway type oil filter when it becomes necessary to change the oil filter 32. In addition, the oil filter 32 could be constructed without the fitting 56 and provided with an inexpensive bail-type handle for the top wall 50 thereof whereby the oil filter 32 could be utilized as a throw-away type cartridge for an oil filter assembly including its own housing for removably receiving an oil filtering body.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An oil flter comprising an elongated housing including generally cylindrical side wall portions and an integral end wall at one end, a hollow cylinder of filtering material of appreciable radial thickness snugly disposed lengthwise of said housing against said side wall portions with the one end thereof adjacent said end wall and being spaced therefrom, said cylinder of filtering material including a tubular core, imperforate intermediate its ends, tightly disposed therein, the end of said core adjacent said end wall being spaced therefrom and at least generally centered in said one end of said housing by said cylinder of filtering material, a first annular mesh panel disposed over and abutted against said one end of said cylinder of filtering material adjacent said end wall, spaced from the latter and secured to the adjacent end of said core, a tubular fitting having one end portion telescoped and secured in the other end of said core remote from said end wall, the other end of said fitting projecting outwardly of said core and the corresponding end of said housing and including a radially outwardly projecting circumferential flange, a second annular mesh panel disposed in the other end of said housing and spaced outwardly of said cylinder of filtering material, an apertured annular end wall overlying the outer surfaces of said second annular mesh panel and closing and defining the last-mentioned end of said housing and to and through which said other end of said fitting extends and is secured with said flange overlying the outer surface of the inner periphery of said annular end wall, and the inner peripheral portion of said second annular mesh panel and said annular end wall captively retained between the end face of said other end of said core and said flange, at least the other end of said fitting being internally threaded for threaded engagement with the inlet end of a return oil passage, said annular end wall being apertured inwardly of its outer periphery and outwardly of said flange for the admission of oil to be filtered into said housing, said cylindrical side wall portions including means, adjacent said one end of said housing, defining inwardly projecting shoulder means extending about said housing and against which the outer peripheral portions of the first mentioned mesh panel are abutted, the outer surface of the apertured annular end wall disposed between the outer periphery thereof and the apertures formed through the apertured annular end wall haivng an annular sealing washer disposed thereon for axial compression between the outer surface of said annular end wall and opposing annular surface portions of an engine block from which the inlet end of a return oil passage projects.

2. The combination of claim 1 wherein said shoulder means comprises an inwardly projecting circumferentially extending and continuous corrugation formed in said cylindrical wall portions.

References Cited

UNITED STATES PATENTS

| 3,405,805 | 10/1968 | Hatter | 210—439 X |
| 3,342,339 | 9/1967 | Riolo | 210—440 X |
| 478,157 | 7/1892 | Eastman | 210—439 X |
| 2,087,887 | 7/1937 | Gesner | 210—439 X |
| 2,202,379 | 5/1940 | Hewel. | |
| 2,218,226 | 10/1940 | Williams. | |
| 2,406,308 | 8/1946 | Vokes et al. | |
| 2,622,737 | 12/1952 | Balley | 210—439 X |
| 2,758,719 | 8/1956 | Line. | |
| 3,184,063 | 5/1965 | Buckman | 210—440 X |
| 3,308,956 | 3/1967 | Yee et al. | 210—232 |
| 3,346,120 | 10/1967 | Russo et al. | 210—439 |

FOREIGN PATENTS 656,815    1/1963    Canada.

REUBEN FRIEDMAN, Primary Examiner

W. S. BRADBURY, Assistant Examiner

U.S. Cl. X.R.

210—440, 443, 451, 477, 494